(Model.)
C. KERRISON, Jr.
FISH HOOK.
No. 377,033. Patented Jan. 31, 1888.
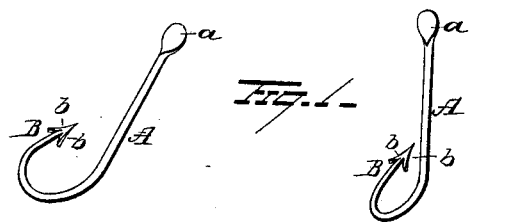
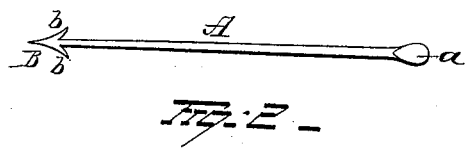
Witnesses
J. E. Jones
G. F. Downing.
Inventor
Charles Kerrison Jr
By his Attorney
H. A. Seymour.

UNITED STATES PATENT OFFICE.

CHARLES KERRISON, JR., OF CHARLESTON, SOUTH CAROLINA.

FISH-HOOK.

SPECIFICATION forming part of Letters Patent No. 377,033, dated January 31, 1888.

Application filed May 6, 1887. Serial No. 237,336. (Model.)

*To all whom it may concern:*

Be it known that I, CHARLES KERRISON, Jr., of Charleston, in the county of Charleston and State of South Carolina, have invented certain new and useful Improvements in Fish-Hooks; and I do hereby declare the following to be a full, clear, and exact description of the invention, such as will enable others skilled in the art to which it appertains to make and use the same.

My invention relates to an improvement in fish-hooks, the object of the same being to construct a fish-hook that will be simple, durable, and effective in use, and capable of being manufactured at a slight initial cost.

A further object is to provide a hook that will hold the bait when placed thereon securely against displacement, and one that will hold a fish when caught until designedly released; and with these ends in view my invention consists in certain features of construction and combinations of parts, as will be hereinafter described, and pointed out in the claim.

In the accompanying drawings, Figure 1 is a view in perspective of my improved fish-hook. Fig. 2 is a view of the fish-hook before being bent into shape.

A represents the shank of the hook bent in the usual manner, having a flattened or loop termination at one end, *a*, and a sharp point, B, at the opposite end. Curving slightly laterally from the point B, and terminating in sharp ends deflecting inwardly toward the shank of the hook, are the barbs or wings *b b*. These barbs or wings *b* are formed integral with the shank, and are made by flattening the end and stamping or otherwise cutting the barbs therefrom, the shank being pointed near them. The hook is then bent into form, and may be made to diverge slightly either to the right or left, as desired, and this construction is especially adapted for sea-fishing where large fish abound, as the hook, on account of its divergement and the double-barbed head, catches in the strong part of the mouth, and makes it hard, if not impossible, for the fish to break away or become disengaged in any way.

The advantages possessed by my device are manifold, inasmuch as it securely holds the bait when placed thereon, and better secures the fish when hung, making it impossible for it to become disengaged either by backing or any other means, while its simplicity and effectiveness, taken in connection with its cheapness and durability, make it a staple article.

It is evident that slight changes might be resorted to in the form and arrangement of the hook without departing from the spirit and scope of my invention; hence I would have it understood that I do not limit myself strictly to the exact construction herein set forth, but consider myself at liberty to make such changes as fall within the spirit and scope of my invention.

Having fully described my invention, what I claim as new, and desire to secure by Letters Patent, is—

A fish-hook having the double-barbed end, the pointed ends of said barbs being bent inwardly toward the shank of the hook, substantially as set forth.

In testimony whereof I have signed this specification in the presence of two subscribing witnesses.

CHARLES KERRISON, JR.

Witnesses:
E. N. FULLER,
JOS. W. BARNWELL.